US011163044B2

(12) United States Patent
Holleczek et al.

(10) Patent No.: US 11,163,044 B2
(45) Date of Patent: Nov. 2, 2021

(54) LIDAR SYSTEM

(71) Applicant: Robert Bosch GmbH, Stuttgart (DE)

(72) Inventors: Annemarie Holleczek, Stuttgart (DE); Hans-Jochen Schwarz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 754 days.

(21) Appl. No.: 15/994,159

(22) Filed: May 31, 2018

(65) Prior Publication Data

US 2018/0348348 A1 Dec. 6, 2018

(30) Foreign Application Priority Data

Jun. 1, 2017 (DE) .................... 102017209259.9

(51) Int. Cl.
| | |
|---|---|
| *G01S 7/486* | (2020.01) |
| *G01S 7/481* | (2006.01) |
| *G01S 7/499* | (2006.01) |
| *G01S 7/489* | (2006.01) |
| *G01S 17/931* | (2020.01) |

(52) U.S. Cl.
CPC ........... *G01S 7/4868* (2013.01); *G01S 7/489* (2013.01); *G01S 7/4812* (2013.01); *G01S 7/499* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,787,131 B1 | 8/2010 | Moran | |
| 9,246,303 B1 * | 1/2016 | Rockwell | .............. G01S 7/4814 |
| 2008/0137058 A1 | 6/2008 | Cesare | |
| 2010/0128109 A1 | 5/2010 | Banks | |
| 2017/0350575 A1 * | 12/2017 | Hill | ........................... G01J 3/18 |
| 2018/0275254 A1 * | 9/2018 | Wu | ......... G01S 7/4876 |
| 2018/0275274 A1 * | 9/2018 | Bao | .......................... G01S 7/486 |
| 2019/0302492 A1 * | 10/2019 | Takizawa | .............. G02B 21/06 |

FOREIGN PATENT DOCUMENTS

| | | |
|---|---|---|
| DE | 9410659 U1 | 10/1994 |
| WO | 0014479 A1 | 3/2000 |

* cited by examiner

*Primary Examiner* — Yuqing Xiao
*Assistant Examiner* — Amir J Askarian
(74) *Attorney, Agent, or Firm* — Norton Rose Fulbright US LLP; Gerard Messina

(57) ABSTRACT

A lidar system comprising a laser light source for emitting laser light, a light modulator unit, and a detector, the laser light emitted by the laser light source and reflected by an object being directed first through the light modulator unit and thereupon onto the detector, and the light modulator unit being designed to modify over time a light output that strikes the detector.

13 Claims, 3 Drawing Sheets

LIDAR SYSTEM

CROSS REFERENCE

The present application claims the benefit under 35 U.S.C. § 119 of German Patent Application No. DE 102017209259.9 filed on Jun. 1, 2017, which is expressly incorporated herein by reference in its entirety.

BACKGROUND INFORMATION

The present invention relates to a lidar system. The present invention also relates to a vehicle, comprising such a lidar system.

Conventional lidar scanners generally either have a macromirror or a rotating aggregate unit. The design of the scanners is usually biaxial, which means that a transmission path and a receiving path have separate transmission routes and receiving routes. In coaxial scanners, transmission paths and receiving paths are largely identical.

A lidar system is described in U.S. Patent Application Pub. No. 2008/137058 A, for example. In this instance, a polarizing beam splitter is used as well as a quarter-wave plate. A laser light source emits light in a linear polarization direction, which passes through the beam splitter and the quarter-wave plate. The reflected light in turn passes through the quarter-wave plate and the beam splitter and is coupled out by the beam splitter to the detector. Since the quarter-wave plate is thus effectively traversed twice, it functions as a half-wave plate. This means that light is rotated from an original polarization to the polarization rotated by 90°. This makes it possible to divert a maximum quantity of light to the detector. The detector may be made up of several pixels and may be based on an avalanche photodiode, in particular using single photon detection (SPAD).

In conventional lidar systems, in particular as previously described, there is, however, the risk of optical crosstalk between individual pixels of the detector. This is also known as blooming. Blooming is particularly problematic in spatially resolved lidar systems since the position of the object to be detected can only be measured at a great error tolerance. In addition, the lidar system may be blinded in that an excessive quantity of light is cast back onto the detector. The quantity of light cast back is not necessarily emitted by the laser light source itself; rather, such light may also come from other lidar systems or from sunlight. In any event, the function of the lidar system is suspended. Hence, conventional lidar systems have in particular the following shortcomings:

If light is cast by the lidar system onto a target that is located very near the output face of the lidar system, the detector is excessively irradiated if the emitted beam power is adjusted to the maximum range of the lidar system and a weakly reflecting target. This is particularly disadvantageous in use in motor vehicles when the target is a retroreflector, for example a license plate of a preceding vehicle. The described high beam power that strikes the detector results in optical crosstalk and thus in the loss of the resolution capacity of the sensor. Consequently, there is the risk that targets are detected in wrong locations. In another case, it is possible that additional light is added in addition to the emitted laser light. The detector is thus blinded. This is particularly harmful if SPAD detectors are used that have a long dead time, in which they are blind due to system-related factors, which means that they are unable to perform further measurements.

SUMMARY

An example lidar system according to the present invention varies a received quantity of light over a range of the sensor so that the same quantity of light is always registered. This prevents optical crosstalk, that is, blooming, in a spatially resolving detector. Likewise, the resolution capacity is also maintained even in nearby, highly reflective targets. The lidar system furthermore allows for the performance of causality checks by range adaptations. Finally, a detector of the lidar system is prevented from being blinded by excessive useful light and/or interfering light.

The lidar system of the present invention comprises a laser light source for emitting laser light. The lidar system also comprises a light modulator unit as well as a detector. The light modulator unit is used to modify a light output over time. The laser light source is set up to emit laser light, the laser light being subsequently reflectable by an object in the surroundings of the lidar system. If the laser light then strikes the lidar system again, it first passes through the light modulator unit and thereupon through the detector. The light modulator unit distributes the received laser light onto the detector over time. A distribution occurs in particular in such a way that first a predefined threshold light quantity strikes the detector, while in the further course the light modulator unit keeps the quantity of light on the detector constant. If laser light that was emitted by the lidar system is reflected back already after a short propagation time of the laser light, then a high amount of light energy strikes the lidar system. Conventional lidar systems would be blinded in this case and would no longer be able to measure correctly. By contrast, the lidar system of the present invention makes it possible to transmit a firmly definable quantity of light across the range of the lidar system onto the detector in a constant manner. The range of the lidar system corresponds in particular to the twofold maximum distance. A precise spatial resolution is made possible because the detector is not blinded due to the reduced light output. The light modulator is in particular controlled in such a way that a constant quantity of light always strikes the detector so that the detector always generates a constant signal.

Preferred developments of the present invention are described herein.

The example light modulator unit in accordance with the present invention preferably comprises a Pockels cell having a downstream polarizing beam splitter and a control unit. The Pockels cell is designed to rotate a polarization of the laser light continuously between a predefined first polarization and a predefined second polarization. The beam splitter is designed to transmit the laser light onto the detector as a function of the polarization. This means that the beam splitter is designed to divide the laser light as a function of its polarization so as to transmit only a portion of the incident light to the detector. Due to the variability of the polarization by the Pockels cell, this results in a continuous adjustment of the quantity of light on the detector. The control unit is preferably designed to control the Pockels cell in such a way that the polarization rotates between the first polarization and the second polarization in a linearly or quadratically increasing or decreasing manner. The linear case, that is, the linear control of the Pockels cell, results in a uniform distribution of the incident reflecting laser light on the detector over time. However, the light output decreases with an increasing measuring distance since light is scattered in the surroundings. It this case, the quadratic control of the Pockels cell helps to compensate for this effect. In particular, this compensates for the fact that the reflected quantity of light decreases quadratically with the measuring distance of the reflecting objects from the lidar system. Thus, a constant signal is always to be expected on the detector.

In an advantageous specific embodiment, the lidar system has an additional detector. The beam splitter is then advantageously designed to distribute the received light between the detector and the additional detector as a function of the polarization determined by the light modulator. Particularly preferably there is a provision for the beam splitter to transmit the laser light in the first polarization completely onto the detector and to transmit it in the second polarization completely onto the additional detector. This means that in the case of a short distance of the object from the lidar system, the reflected light is expected mainly on the additional detector. With an increasing distance between the object and the lidar system, the signal is expected especially on the detector. The respective other detector then only has a small portion of the quantity of light.

Particularly advantageously, the lidar system is provided to have a control unit. The control unit is used to evaluate the signals of the detector and of the additional detector. The control unit is also designed to control the Pockels cell. The control unit is in particular designed to control the Pockels cell in such a way that it rotates the polarization of the laser light between the first polarization and the second polarization within a predefined time span. The predefined time span is preferably such a period of time as is required for the laser light to propagate through a twofold maximum measuring distance of the lidar system. The maximum measuring distance is such a distance as an object may maximally have with respect to the lidar system in order to be measured by the lidar system. The twofold maximum measuring distance is thus the distance that the laser light must traverse in order to get from the lidar system to the object having the maximum measuring distance and back again to the lidar system. The time that the laser light requires for this distance thus corresponds to the maximum time that the laser light spends outside of the lidar system. By continuously changing the polarization using the Pockels cell over this period of time, it is thus possible to infer a distance between the lidar system and the object on the basis of the light distribution between the detector and the additional detector. The present invention thus provides particularly advantageously that in the case of objects, which are located in very close proximity to the lidar system, the additional detector responds due to reflected laser light, while the detector receives only a very small light output. With increasing distance, the light output that is directed onto the detector increases, while the light output that is directed onto the additional detector continuously decreases. At a maximum measuring distance the reflected light is directed completely or almost completely onto the detector. This means that there is another parameter available, in addition to the propagation time of the light, in order ascertain the distance of a light-reflecting object from the lidar system. This may be used to render the distance measurement more concrete and/or to plausibilize it.

Apart from preventing the lidar system from being blinded, as previously described, the present invention also particularly advantageously allows for the control unit to perform a causality check. For this purpose, the present invention provides for the control unit to compare a signal expected on the detector and the additional detector due to the polarization set by the Pockels cell with an actual signal. As described previously, the present invention provides in particular that in the case of near targets the emitted laser light is expected to strike the lidar system again after a short time. Together with the previously described distribution of the reflected laser light onto the detector and the additional detector, which is variable over time, it is thus possible to perform a causality check. This means that laser light that was emitted and that strikes a nearby target has a short propagation time. This light must for the most part strike the additional detector. If more light than expected is detected on one of the detectors, then this is outside light and/or stray light. It is thus not possible for the lidar system to be disturbed by outside light, for example by sunlight or by other lidar systems. Particularly advantageously, it is also possible to perform a causality check in such a way that in the case of a signal on both detectors a check is performed simultaneously and at the same level to determine whether according to propagation time measurement it concerns an object that is at half of the maximum measuring distance from the lidar system.

Particularly advantageously, the control unit is also designed to perform a comparison measurement. For this purpose, signals from pixels of the detector are compared with signals from corresponding pixels of the additional detector. If the quantity of light striking the detector is reflected by a real object near the sensor, the additional sensor is blinded. The positive causality check may be developed as follows: Detector sees a nearby object, additional detector is blinded, positive identification of a nearby, highly reflective target. If the sensor registers by irradiation of outside laser light a light quantity on the detectors independently of the emission of the lidar system's own light pulse, it is thus possible to infer outside light.

The detector and/or the additional detector preferably comprise a plurality of avalanche photodiodes, particularly advantageously having single photon detection. Such an avalanche photo diode is simple and cost-effective to manufacture and is thus advantageous in the use of lidar systems. At the same time, avalanche photodiodes allow for a secure and reliable measurement of laser light that strikes the respective detectors.

The Pockels cell is advantageously designed to rotate the polarization of the laser light continuously between zero and lambda/4. Such a rotation ensures that the laser light is directed at the start or at the end of the rotation completely onto the detector so that the detector detects a constant light output and is free of optical crosstalk.

The Pockels cell is advantageously designed to rotate the polarization between zero and lambda divided by four within maximally 2.0 µs, preferably maximally 1.5 µs, in particular maximally 1.2 µs. Such a rotation results in particular in a maximum measuring distance between the reflecting object and the lidar system of 180 m.

Finally, the present invention also relates to a vehicle that comprises a lidar system as previously described. The lidar system makes it possible for the vehicle securely and reliably to detect and measure a surroundings, the lidar system being at the same time protected against interference from other lidar systems and/or against being blinded by incident outside light. The lidar system is thus optimally suited for use in a vehicle since such interfering lights often occur in the surroundings of vehicles. On account of the lidar system, the vehicle is thus able to detect the surroundings securely and reliably.

BRIEF DESCRIPTION OF THE DRAWINGS

Exemplary embodiments of the present invention are described below in detail with reference to the figures.

DETAILED DESCRIPTION OF EXAMPLE EMBODIMENTS

Figure 1:
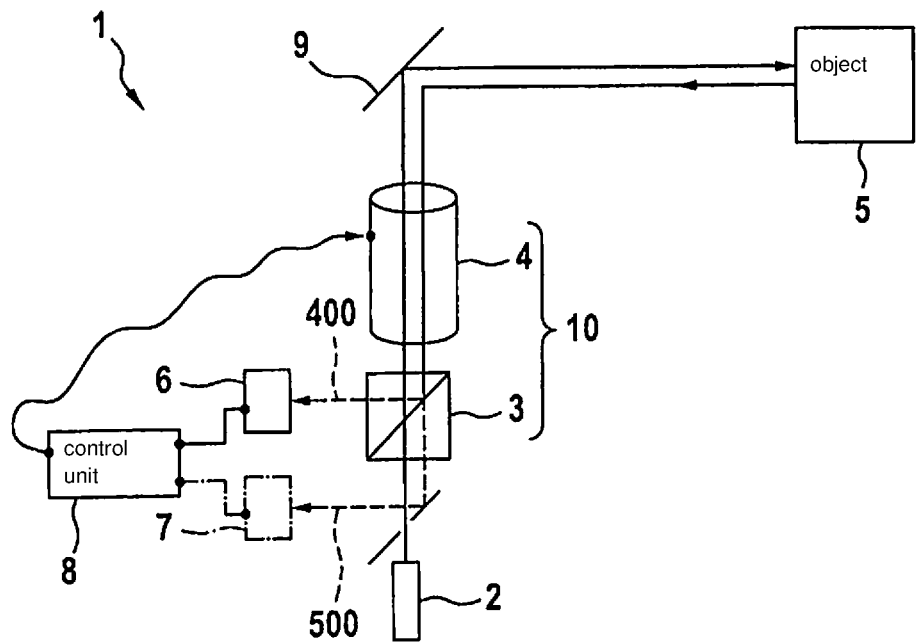
FIG. 1 is a schematic view of a lidar system according to an exemplary embodiment of the present invention.

FIG. 1 shows schematically a lidar system according to an exemplary embodiment of the present invention. Lidar system 1 comprises a laser light source 2 and a light modulator unit 10. In the exemplary embodiment shown, the light modulator unit 10 is implemented by a beam splitter 3 and a Pockels cell 4. Laser light source 2 is used to emit a laser light. The laser light passes through the components of beam splitter 3 and Pockels cell 4, as a result of which the laser light obtains a predefined polarization. Subsequently, the laser light passes through a deflecting device 9 and is deflected by deflecting device 9. Deflecting device 9 is in particular designed to be movable and allows for the laser light to be deflected onto different areas in a surroundings of lidar system 1.

The laser light emitted by lidar system 1 is reflected by an object 5 in the surroundings of lidar system 1. Lidar system 1 is developed to be in particular coaxial, as a result of which the reflected laser light, which was reflected by object 5 and strikes lidar system 1, takes the same optical path as the laser light emitted by laser light source 2.

After the reflected laser light strikes the deflecting device 9, the laser light is initially directed through the light modulator unit 10 and subsequently onto detector 6. Light modulator unit 10 is used to vary the quantity of light over time so that detector 6 is not blinded. In the exemplary embodiment shown, beam splitter 3 distributes the reflected laser light depending on its polarization through Pockels cell 4 onto a detector 6. In particular, the reflected laser light is directed by beam splitter 3 depending on its polarization also onto an optionally present additional detector 7. Detector 6 and additional detector 7 are advantageously designed identically. The polarization is adjustable by the Pockels cell 4. Light modulator unit 10 may also be designed differently and does not necessarily have to comprise a Pockels cell 4 and a beam splitter 3.

The adjustment of the polarization of the laser light with the aid of Pockels cell 4 is controlled by a control unit 8. This means that control unit 8 is set up to control Pockels cell 4, in particular by an electric voltage, in order thus to influence the polarization of the reflected laser light. Control unit 8 is additionally connected for signal transmission to detector 6 and additional detector 7 in order thus to read out the signals of detector 6 and additional detector 7.

Figure 2:
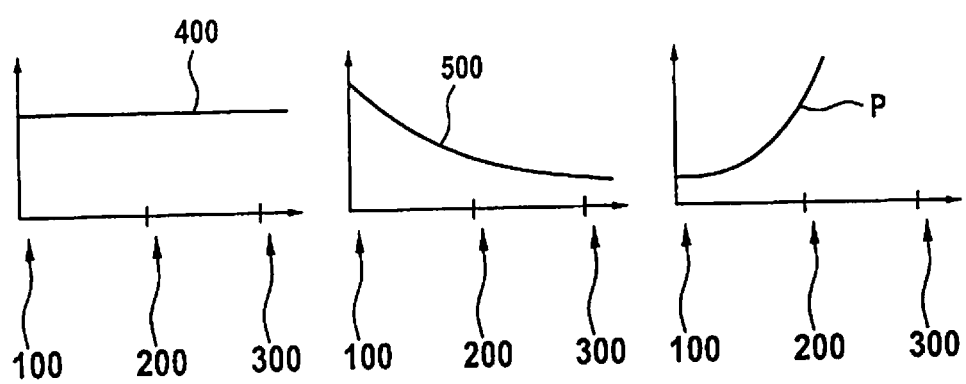
FIG. 2 is a schematic view of a control of a Pockels cell of the lidar system according to the exemplary embodiment of the present invention.

FIG. 2 schematically shows the distribution of the light output of the reflected laser light onto detector 6 and additional detector 7. A first light beam 400, which is directed by beam splitter 3 onto detector 6, is shown in a corresponding curve in a diagram, the abscissa indicating the polarization, while the ordinate indicates a light output. Likewise, a second light beam 500, which is directed by beam splitter 3 onto the optional additional detector 7, is indicated in another coordinate system. Here the ordinate and the abscissa have the same coordinates as previously described. Finally, a control curve P of the light modulator unit 4 developed as a Pockels cell 4 is shown, the ordinate and abscissa again having the same coordinates as previously described.

It is thus apparent that Pockels cell 4 rotates the polarization from a first polarization 100 to a second polarization 200, as a result of which the light output, which is detected at detector 6, remains constant due to beam splitter 3. Pockels cell 4 is preferably designed for continuously rotating the polarization so that upon reaching the second polarization 200, the polarization is rotated further in order to reach a third polarization 300. Third polarization 300 is preferably oriented parallel to first polarization 100 so that the light outputs, which are transmitted by beam splitter 3 onto detector 6, and in particular onto additional detector 7, are identical as during first polarization 100.

Since in reality a reflected laser light output that reaches Pockels cell 4 diminishes quadratically with increasing measuring distance between object 5 and lidar system 1, a reduction of the light output received on detector 6 is detectable in the event of a great change in the polarization. This is not caused by Pockels cell 4 or by beam splitter 3, however, but is based on the described effect of the quadratically diminishing light output with increasing distance of object 5 from lidar system 1. In order to compensate for the effect, Pockels cell 4 is controlled by control unit 8, not in linear fashion, but in quadratic fashion, as may be seen from control curve P. A change in the polarization thus does not occur in a linear manner, but quadratically.

The curve of the distribution of light output of the reflected laser light onto detector 6, and especially onto additional detector 7, which is shown in FIG. 2, thus reveals that a constant signal is always generated on detector 6. Detector 6 is thus used to receive laser light without interference, eliminating in particular crosstalk. If the previously described additional detector 7 exists, then the causality check is performed in that the laser light detected on the additional detector 7 is checked. If second light beam 500 deviates from the curve for second light beam 500 shown in FIG. 2, then it is highly probable that lidar system 1 is being blinded.

Lidar system 1 further makes it possible to avoid blinding. If the laser light is reflected, for example, by a highly reflecting object 5, which is the case for example in retroreflectors of license plates of vehicles for example, then a high light output is reflected back onto lidar system 1. This has the result that in the case of nearby objects 5, additional detector 7 experiences a high light output. This high light output results in crosstalk on additional detector 7, as a result of which a spatial resolution is no longer possible. Whereas a lower light output is directed onto detector 6. The causality check indicates that the measuring result is plausible, since the light was directed mainly onto additional detector 7. It is thus a valid measuring result. It is thus possible to calculate a distance of object 5 from lidar system 1 on the basis of transit-time measurement. Due to the crosstalk, however, no spatial resolution is possible by additional detector 7. The spatial resolution may therefore be ensured by detector 6.

If it should be the case that only particular areas of additional detector 7 are blinded, then a spatial resolution of additional detector 7 is merely limited. This is shown in exemplary fashion in FIG. 3. Thus, FIG. 3 shows a detector 6 represented by a segment of four pixels, a first pixel 61, a second pixel 62, a third pixel 63 and a fourth pixel 64.

The pixels of additional detector 7 corresponding to first pixel 61, second pixel 62, third pixel 63 and fourth pixel 64 are likewise shown. These are a fifth pixel 71, a sixth pixel 72, a seventh pixel 73 and an eighth pixel 74. Fifth pixel 71, sixth pixel 72, seventh pixel 73 and eighth pixel 74 are blinded due to a high light output.

Figure 3:
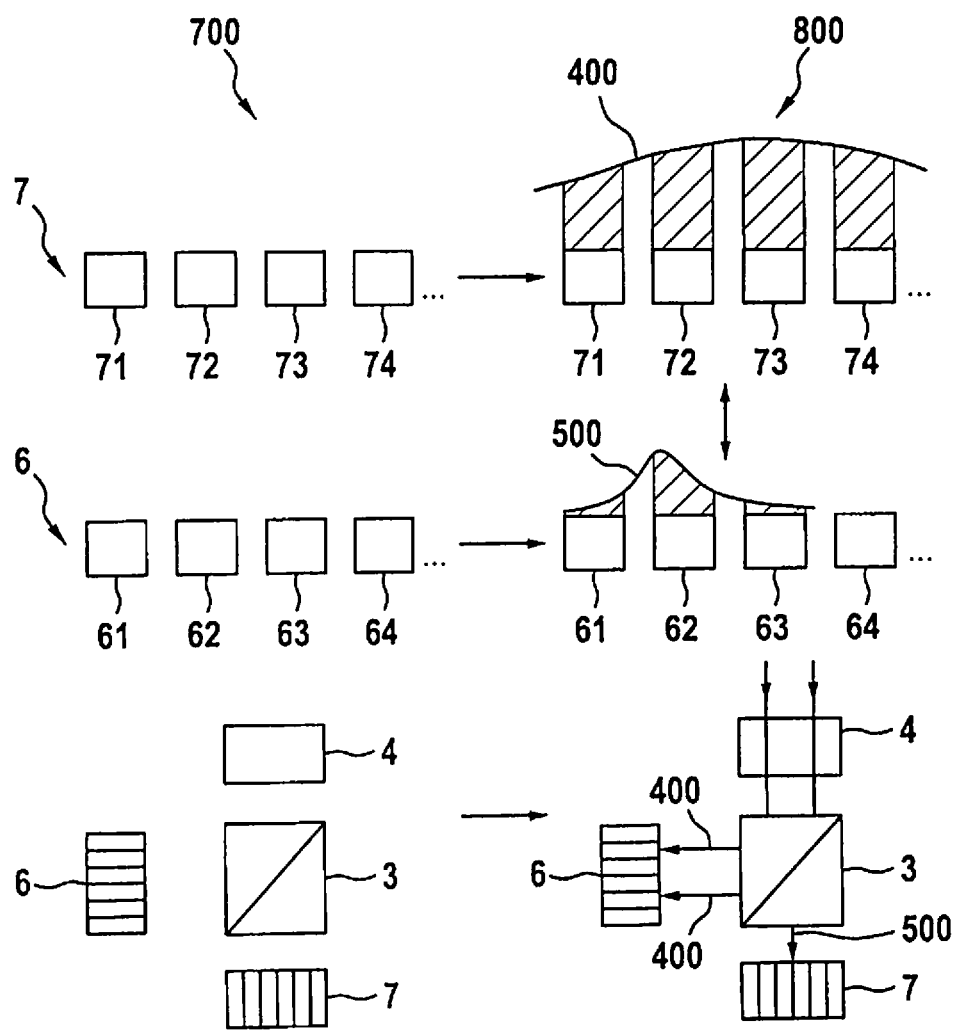
FIG. 3 is a schematic sequence of a comparison measurement using the lidar system according to the exemplary embodiment of the present invention.

FIG. 3 shows two states. In a first state 700, there is no illumination. In a second state 800, lidar system 1 is illuminated by a high light output, which strikes lidar system 1 by being reflected on an object 5. It can be seen that second light beam 500 has a high output and thus blinds all indicated pixels 71, 72, 73, 74 of additional detector 7. This blinding, however, is only local and does not result in a global blinding of additional detector 7. At the same time, however, the spatial resolution of additional detector 7 is limited since this spatial resolution only comprises a unit of four pixels. For this reason, a comparison measurement is performed using first light beam 400. First light beam 400 has a markedly lower light output. For this reason, only one single pixel 61, 62, 63, 64 of detector 6 is addressed. FIG. 3 shows an address of second pixel 62. The comparison measurement of detector 6 and of additional detector 7 thus makes it possible to improve the spatial resolution since from the measurement of detector 6 it is possible to identify second pixel 62 as the relevant pixel. This ensures that a correct measurement was performed, a spatial resolution being at the same time maximized by using both detector 6 and additional detector 7.

Pixels 61, 62, 63, 64 of detector 6 and pixels 71, 72, 73, 74 of additional detector 7 are in particular avalanche photodiodes, particularly advantageously having single photon detection. These are characterized by the fact that they can be manufactured very simply and without great effort and thus cost-effectively. At the same time, however, such photodiodes have a long dead time after a measurement. In the case shown in FIG. 3, the fifth pixel 71, the seventh pixel 73 and the eighth pixel 74 would have a dead time, even though there are no objects 5 in the location of the surroundings represented by respective pixels 71, 73, 74. Rather, these pixels 71, 73, 74 were controlled exclusively on the basis of the crosstalk. Additional detector 7 is therefore blind at the location of the fifth pixel 71, the seventh pixel 73 and the eighth pixel 74, although no meaningful measurement was performed on these pixels. However, the corresponding first pixel 61, the corresponding third pixel 63 and the corresponding fourth pixel 64 of detector 6 continue to be available. Using these pixels 61, 63, 64, it is possible to continue to monitor those areas that are blind on additional detector 7. This allows lidar system 1 to perform measurements securely and reliably.

Figure 4:
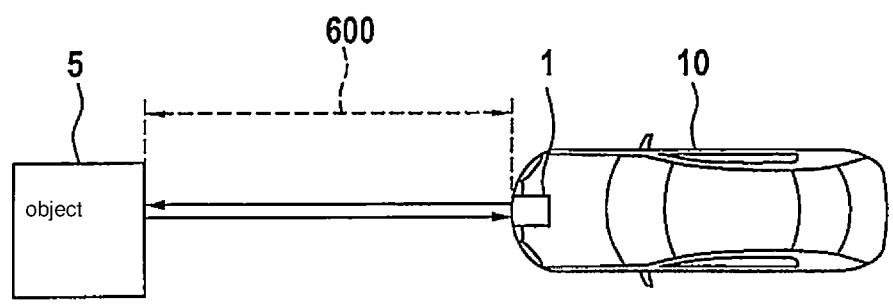
FIG. 4 is a schematic view of a vehicle according to an exemplary embodiment of the present invention.

FIG. 4 shows a vehicle 10 according to an exemplary embodiment of the present invention. Vehicle 10 comprises lidar system 1, as described previously. Lidar system 1 is thus designed to perform secure and reliable measurements. Lidar system 1 is in particular able to detect objects 5 up to a maximum measuring distance 600. In order to perform secure and reliable measurements, the present invention provides for Pockels cell 4 to be controlled in such a way that a rotation is performed between first polarization 100 and second polarization 200, which means in particular a polarization around lambda/4, within such a time period as is required for the laser light to propagate twice through the maximum measuring distance 600. This means that the rotation around lambda/4, in particular the rotation between first polarization 100 and second polarization 200, requires exactly as much time as the maximum propagation time of the emitted laser light.

Such a division of the laser light allows for another plausibility check. If it is determined on the basis of a propagation time measurement that the object 5 must be located at half the maximum measuring distance 600, and thus has half the maximum measuring distance 600 from lidar system 1, then the reflected laser light 3 must be distributed by beam splitter 3 evenly onto detector 6 and additional detector 7 due to the polarization set by Pockels cell 4. If the light outputs detected on detector 6 and additional detector 7 are not identical or nearly identical, then this indicates an error.

Lidar system 1 is thus able to be operated securely and reliably, errors being on the one hand directly detectable during measurements, while on the other hand outside light or blinding do not result in a failure of the lidar system. Lidar system 1 is thus advantageously suited for use in vehicles 10, where the previously described interferences cannot be ruled out.

What is claimed is:

1. A lidar system, comprising:
   a laser light source for emitting laser light;
   a light modulator unit; and
   a detector, the laser light emitted by the laser light source and reflected by an object first being directed through the light modulator unit and thereupon onto the detector;
   wherein the light modulator unit is configured to modify over time a light output, which strikes the detector, and
   wherein the light modulator unit has a Pockels cell, a polarizing beam splitter situated downstream, and a control unit, the Pockels cell being configured to rotate a polarization of the laser light continuously between a predefined first polarization and a predefined second polarization, the beam splitter being configured to vary a light quantity of the laser light directed onto the detector as a function of the polarization, and wherein the control unit is configured to control the light modulator unit to rotate the polarization.

2. The lidar system as recited in claim 1, the control unit is configured to control the light modulator unit to rotate the polarization between the first polarization and the second polarization one of linear fashion or quadratic fashion.

3. The lidar system as recited in claim 2, wherein the control unit controls the light modulator to rotate the polarization increasingly or decreasingly.

4. The lidar system as recited in claim 2, further comprising:
   an additional detector, the beam splitter being configured to distribute the laser light as a function of the polarization between the detector and the additional detector.

5. The lidar system as recited in claim 4, wherein the beam splitter is configured to direct the laser light in the first polarization completely onto the detector and in the second polarization completely onto the additional detector.

6. The lidar system as recited in claim 5, wherein the control unit is de configured signed to evaluate the signals of the detector and of the additional detector, the control unit being also configured to control the light modulator unit so that the light modulator unit rotates the polarization of the laser light between the first polarization and the second polarization within a predefined time span, the predefined time span being a time period as is required by the laser light to propagate through twice a maximum measuring distance of the lidar system.

7. The lidar system as recited in claim 6, wherein the control unit is configured to perform a causality check in that it compares a signal to be expected on the detector and on the additional detector due to the polarization set by the light modulator unit with an actual signal.

8. The lidar system as recited in claim 7, wherein the control unit is configured to perform a comparison measurement in which signals of pixels of the detector are compared to signals of corresponding pixels of the additional detector, so as to increase a degree of a spatial resolution.

9. The lidar system as recited in claim 2, wherein the Pockels cell is configured to rotate the polarization of the laser light continuously between 0 and lambda/4.

10. The lidar system as recited in claim 9, wherein the Pockels cell is configured to rotate the polarization around lambda/4 within maximally 2 µs.

11. The lidar system as recited in claim 9, wherein the Pockels cell is configured to rotate the polarization around lambda/4 within maximally 1.5 µs.

12. The lidar system as recited in claim 9, wherein the Pockels cell is configured to rotate the polarization around lambda/4 within maximally 1.2 µs.

13. The lidar system as recited in claim 1, wherein the detector includes a plurality of avalanche photodiodes.

\* \* \* \* \*